United States Patent [19]

Inagaki et al.

[11] Patent Number: 4,607,374
[45] Date of Patent: Aug. 19, 1986

[54] METHOD FOR CONTROLLING ARC FURNACE

[75] Inventors: Etsuo Inagaki, Nagoya; Kikuma Izumi, Aichi, both of Japan

[73] Assignee: Daidotokushuko Kabushikikaisha, Japan

[21] Appl. No.: 634,832

[22] Filed: Jul. 26, 1984

[30] Foreign Application Priority Data

Dec. 23, 1983 [JP] Japan .............................. 58-251811

[51] Int. Cl.$^4$ .......................................... H05B 7/148
[52] U.S. Cl. .................................................. 373/104
[58] Field of Search ............... 373/102, 104, 105, 106, 373/108

[56] References Cited

U.S. PATENT DOCUMENTS 3,432,604  3/1969  Harbaugh ............................ 373/104
3,518,350  6/1970  Lunig .................................. 373/104
4,296,269  10/1981 Stewart et al. ....................... 373/104
4,320,245  3/1982  Gaydon et al. ...................... 373/104

Primary Examiner—Roy N. Envall, Jr.
Attorney, Agent, or Firm—William A. Drucker

[57] ABSTRACT

A method for controlling an arc furnace is disclosed. In first step, many V-curved correlations between a value of arc current and a specific electric power consumption are obtained with respect to each of a plurality of measuring melting materials of various different scrap blendings. Next, in factory operation of the arc furnace, a melting material is melt at an arc current value in the bottom of the curve or in the vicinity of the bottom where the specific electric power consumption is minimal in the pre-obtained V-curve correlation with respect to the measuring melting material of scrap blending corresponding to scrap blending of the melting material to be melted.

1 Claim, 4 Drawing Figures

METHOD FOR CONTROLLING ARC FURNACE

BACKGROUND OF THE INVENTION

1. Field of the Invention

This invention relates to a method for controlling an arc furnace in which various melting materials are melted in the arc furnace.

2. Description of the Prior Art

In melting various melting materials in the arc furnace, it is important to adequately select values of an arc voltage and an arc current to save energy.

SUMMARY OF THE INVENTION

The present invention provides a method for controlling an arc furnace and has its object to provide a method for controlling an arc furnace which can melt various kinds of melting materials taking an energy saving effect into consideration.

According to a feature of the present invention, an arc current is supplied to an arc electrode to produce an arc, and melting materials charged into the furnace are melted by heat of the arc to obtain molten metal.

According to the present invention, in the operation of the arc furnace, a V-curved correlation between an arc current value and a specific electric power consumption with respect to various material of scrap blending is experimentally predetermined. In actual operation, said materials are melted at the arc current value at the bottom of or in the neighbourhood of the curve of the V-curved correlation predetermined with respect to the materials of scrap blending corresponding to the scrap blending of materials to be melted. Accordingly, it has the economic value which can obtain molten metal at an extremely small specific electric power consumption.

Further, according to the present invention, where materials are melted at a current value slightly larger than an arc current value at the bottom of the curve, time required to melt the materials can be shortened without increasing said small specific electric power consumption to a greater extent thereby enhancing the efficiency of operation.

DESCRIPTION OF THE PREFERRED EMBODIMENTS

Figure 1:
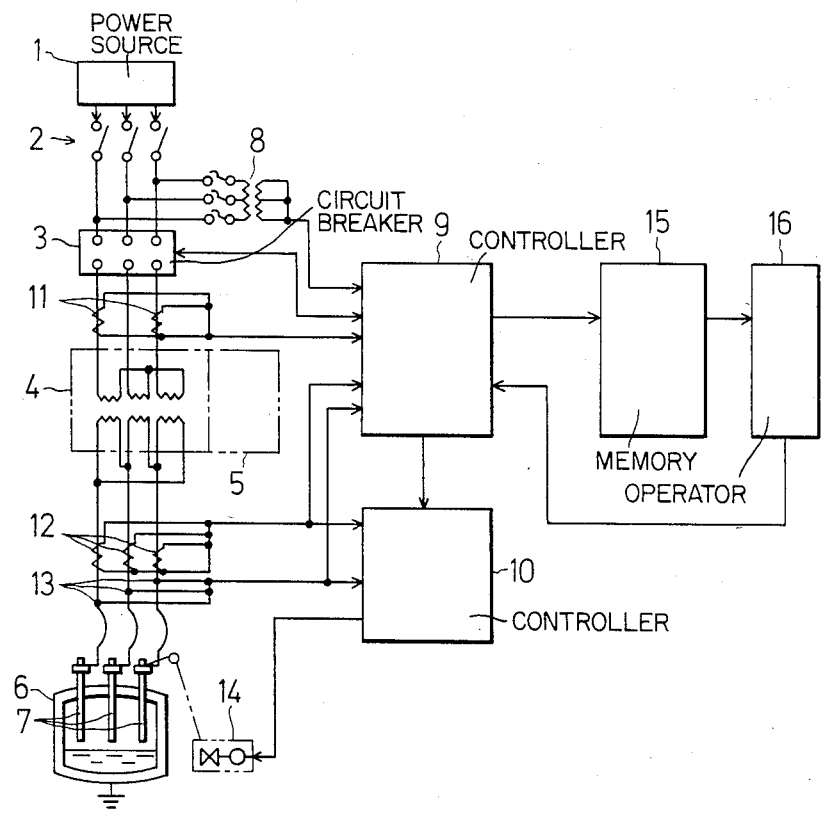
FIG. 1 is a flow chart of an arc furnace.

In FIG. 1, electric power from a high voltage or extra-high voltage power source 1 is introduced into a primary side of a furnace transformer 4 through a disconnecting switch 2 and a circuit breaker 3. The furnace transformer 4 is provided with a tap changer 5 so that an output voltage on the secondary side may be regulated. An output on the secondary side of the furnace transformer 4 is supplied to arc electrodes 7 in an arc furnace 6. An arc furnace controller 9 receives detected values of momentary currents from current transformers 11, 12 provided on the primary and secondary sides, respectively, of the furnace transformer 4 and detected values of momentary voltages from a potential transformer 8 and a voltage detection end 13. These detected values are used to obtain a specific electric power consumption which will be described later. The controller 9 releases set signals of arc current value to an automatic electrode controller 10. The controller 9 further cuts off the circuit breaker 3 in an emergency. The automatic electrode controller 10 receives current detected values from a current transformer 12, voltage detected values from a voltage detection end 13 and arc current value setting signals from the controller 9 to control an electrode elevating device 14 for moving the electrodes 7 up and down. Thereby, the electrodes 7 are positioned at the level where the arc current value is at a predetermined value and an arc having an adequate length is produced.

Figure 2:
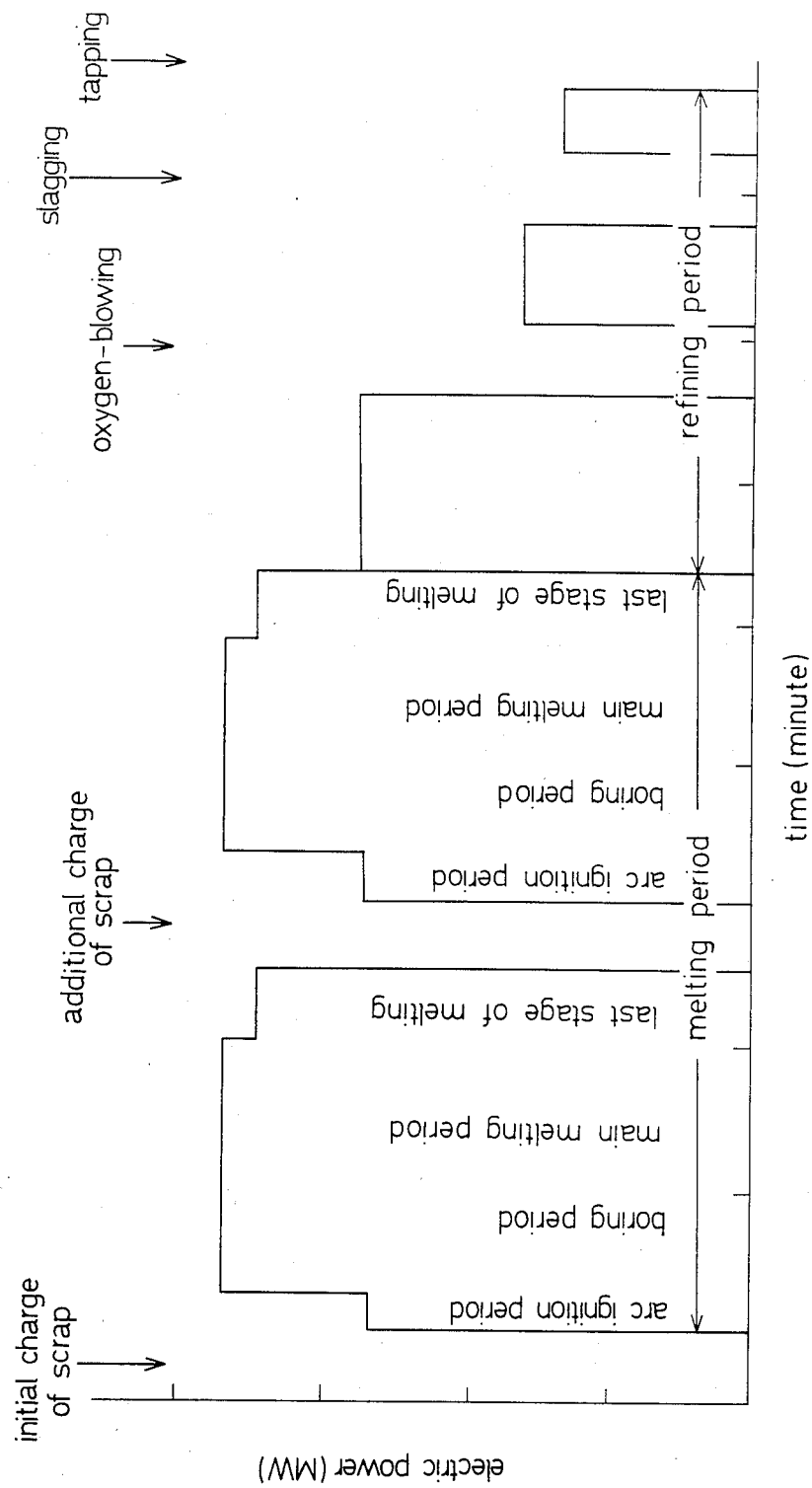
FIG. 2 is a view showing one example of a power applying program of an arc furnace for steel making.

Next, operation of the arc furnace 6 will be described in connection with FIG. 2. In FIG. 2, the axis of abscissa indicates time and the axis of ordinate indicates electric power applied to the arc furnace (arc electrodes). First, an initial charge of melting materials (scrap) into the furnace is provided. The melting materials include various scrap blendings (which are different in bulk density). Upon termination of the initial charge, electric power is supplied to the arc electrodes 7 to ignite an arc and melting of the materials starts. That is, in the furnace the materials are melted by high temperature of the arc in a well known manner. When melting of the materials proceeds and the materials are gradually formed into molten metal, the bulk thereof is reduced. Therefore, generation of an arc is once stopped in the midst of melting period and additional charge of melting materials is provided. Then, melting of the materials thus additionally charged is carried out in a manner similar to the former. After melting of the materials has been completed and all the materials have been formed into molten metal, refining work takes place. In the midst of the refining period, oxygen-blowing, slagging and the like are carried out as is well known. After completion of refining, tapping is carried out.

In the following, operation for reducing the amount of using electric power in melting the melting materials will be explained. A data memory 15 and an arc current value operator 16 are connected to the arc furnace controller 9 as shown in FIG. 1. First, with respect to a plurality of measuring melting materials (the materials are the same as normal melting materials but in case the confusion of terms need be prevented in the present Specification, a modifier of "measuring" is added for explanation) of various kinds of scrap blendings (for example, those which are different in bulk density from each other), a V-curved correlation between an arc current value and a specific electric power consumption under the secondary voltage of the furnace transformer suitable for operation is obtained and an arc current value whose specific electric power consumption is minimal is obtained. The operation is carried out in the following manner. The arc furnace controller 9 receives the aforementioned momentary voltage and curent detected values to calculate momentary power, and momentarily feeds the resultant signals to the next data memory 15. The data memory 15 totals values of power momentarily fed over the whole stage of the melting work as shown in FIG. 2 to calculate all the amount of power at the time of melting work. A signal of the amount of molten steel is put into the data memory 15.

As for the method of putting-in said signal, the amount of tapping tapped from the furnace used for operation can be measured and put into the memory 15. This can be done manually. Alternatively, the tapped amount is measured by an automatic balance, and the signal of the balance is directly coupled and put into the data memory 15. The data memory 15, which has received the aforesaid signal, performs an operation in which the aforementioned whole amount of power is divided by the amount of molten steel. That is, the memory 15 calculates the specific electric power consumption.

Figure 3:
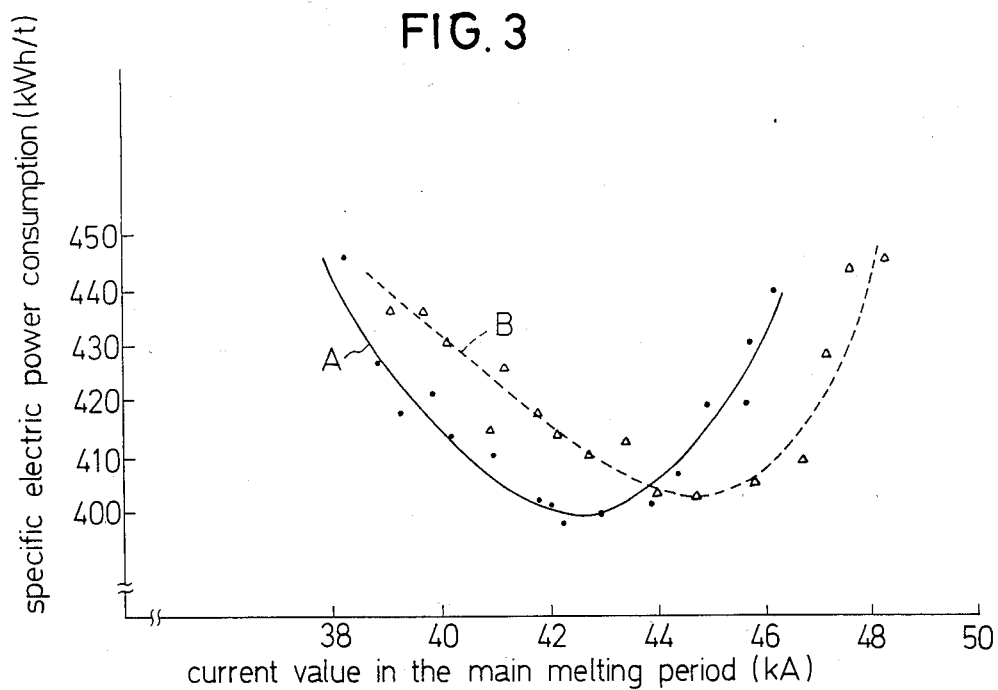
FIG. 3 is a graphic representation showing one example of a relationship between an arc current value and a specific electric power consumption.

First, measuring melting material of one kind of scrap blending is melted as described above in a state wherein an average arc current value is set to a suitable value in a main melting period, and the average current value and the specific electric power consumption in that case in the main melting period are paired and stored in the data memory 15. Next, the operation similar to that as described above is carried out with other material of the same scrap blending as that of the above in a state wherein an average arc current value in the main melting period is variously changed, and a V-curved correlation as shown in FIG. 3 A (or B) between the arc curent value and the specific electric power consumption is stored as data into the memory 15. Where the auxiliary combustion, oxygen-blowing, charge amount of carbon, tapping temperature and the like are different in individual operation in the case the specific electric power consumption is obtained, correction can be made correspondingly so that all the specific electric power consumptions may be obtained under the same condition.

Various melting materials of different scrap blendings are subjected to the above-described operation, whereby finally, a number of data in the correlation of the V-curve as shown in FIG. 3 A (or B) between the arc current value and the specific electric power consumption with respect to each of the materials of scrap blending (bulk density is different) are stored in the data memory 15. Under the conditions of data in FIG. 3 in which rating of the furnace is 70t, 45 MVA, the tap of the transformer is 610 V and tapping temperature is 1640° C., the curve A is obtained for the material of scrap blending of bulk density 0.96, and the curve B obtained for the material of scrap blening of bulk density 1.04.

The arc current value operator 16 reads a number of data stored in the memory 15 to arrange them using a known statistics, or the method of least squares to operate the arc current value in the bottom of the V-curved correlation. that is, the arc current value whose specific electric power consumption is minimal in respect of each melting material of scrap blending. The thus obtained data of current values are divided by the kinds of scrap blending and fed into the arc furnace controller 9. The arc furnace controller 9 stores data fed from the operator 16.

In actual operation, the melting material to be melted is charged into the furnace, and classes of scrap blending of said material are set into the arc furnace controller 9. Then, the melting of the material is carried out in a manner as described above. In this case, in the arc furnace controller 9, the arc current value whose specific electric power consumption is minimal is selected on the basis of data obtained by the measuring melting material of the scrap blending corresponding to the class of the scrap blending previously set to release the arc current value setting signal, by which the arc current value in the furnace 6 is made to assume such a value, to the electrode controller 10. Then, the electrode controller 10 is controlled to thereby actuate the electrode elevating device 14 to move the electrodes 7 up or down, and the arc current value in the main melting period in the arc furnace 6 is controlled to assume a current value set by the arc furnace controller 9. As a result, melting of the melting material can be carried out in the state wherein the specific electric power consumption is minimal.

As will be apparent from FIG. 3, the arc current value in the main melting period is relatively small in value of specific electric power consumption even in the value in the vicinity of the bottom of the curve of the V-curved correlation instead of the value in the bottom thereof. Thus, the aforesaid operation of furnace can be carried out even with the value of the arc current in the vicinity of the bottom as described.

Figure 4:
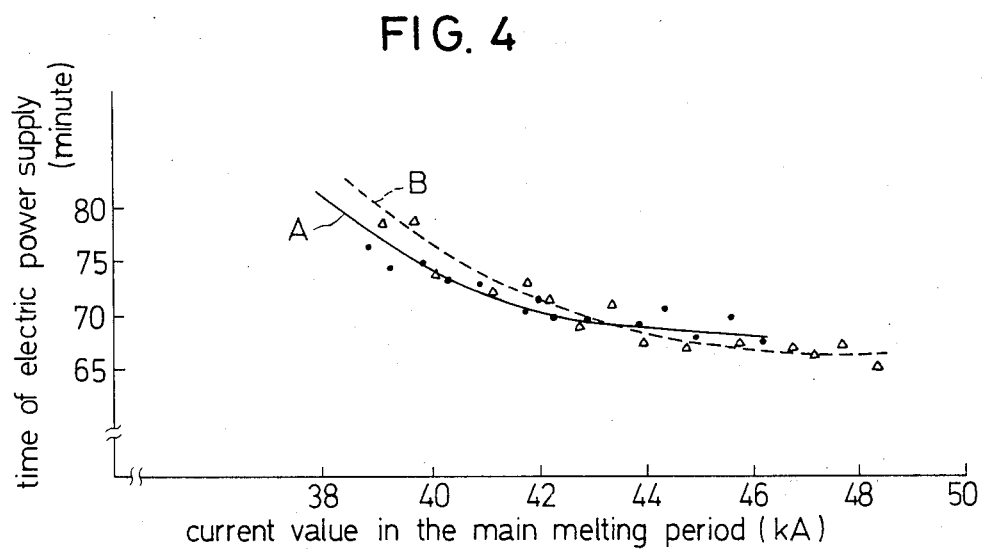
FIG. 4 is a graphic representation showing one example of a relationship between an arc current value and time required to melt materials.

Next, FIG. 4 shows one example of a relationship between the arc current value and the time required to melt the material. (Curves A and B in FIG. 4 show data in respect of the same materials as those shown by the curves A and B in FIG. 3.)

As will be apparent from FIG. 4, if the arc current value is made to increase melting of the material can be carried out in a short period of time. Thus, in connection with the correlation shown in FIG. 3, if operation is carried out with the arc current value (for example, current value 3 to 5% larger) slightly larger than the arc current value in the bottom of the aforesaid curve, melting of the material can be carried out in the state wherein the specific electric power consumption is not so large and in a short period of time. Arc current values slightly larger than the arc current value in the bottom of the curve can be stored as operating data in the arc furnace controller 9 by classes of the scrap blending so that the arc current value at the time of operation may be automatically set to that value.

While in the aforementioned embodiments, the examples have been illustrated in which meaurement of the V-curved correlation and setting of the arc current value at the actual operation are automatically carried out by the apparatus, it should be noted that these can be done manually using various meters.

What is claimed is:

1. A method for controlling an arc furnace including the steps of:
    charging a raw material to be melted into the arc furnace below an arc electrode disposed in the furnace;
    determining an optimum arc current value to be supplied to said arc electrode; and
    melting the raw material charged in said arc furnace by means of an arc generated between said charged raw material and said arc electrode by supplying said determined value of arc current to said arc electrode, said step of determining the optimum arc current value being characterized by the step of selecting an arc current value pre-obtained with respect to a raw material of the same bulk density as that of the raw material charged into the arc furnace, from a plurality of arc current values which are individually pre-obtained with respet to a plurality kinds of raw materials to be melted having respectively different bulk densities, said individual arc current values being current values at which each of the raw materials of various bulk densities is able to be melted in the state wherein the specific electric energy consumption is minimal.

* * * * *